(12) United States Patent
Loh et al.

(10) Patent No.: US 8,022,566 B2
(45) Date of Patent: Sep. 20, 2011

(54) METHODS AND SYSTEMS FOR OPERATING A WIND TURBINE

(75) Inventors: Friedrich Loh, Schuettorf (DE); Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/821,909

(22) Filed: Jun. 23, 2010

(65) Prior Publication Data

US 2011/0140420 A1    Jun. 16, 2011

(51) Int. Cl.
F03B 13/12    (2006.01)
F03D 11/04    (2006.01)

(52) U.S. Cl. .................. 290/44; 290/55; 416/85

(58) Field of Classification Search ............ 290/43, 290/44, 54, 55; 416/85, 224 R
See application file for complete search history.

(56) References Cited

U.S. PATENT DOCUMENTS

| | | | |
|---|---|---|---|
| 6,891,280 B2 * | 5/2005 | Siegfriedsen | 290/44 |
| 7,075,189 B2 * | 7/2006 | Heronemus et al. | 290/44 |
| 7,156,037 B2 * | 1/2007 | Borgen | 114/264 |
| 7,156,586 B2 * | 1/2007 | Nim | 405/223.1 |
| 7,293,960 B2 * | 11/2007 | Yamamoto et al. | 416/85 |
| 7,296,971 B2 * | 11/2007 | Borgen | 416/85 |
| D567,176 S | 4/2008 | Borgen | |
| 7,456,515 B2 * | 11/2008 | Nielsen | 290/55 |
| 7,612,462 B2 * | 11/2009 | Viterna | 290/53 |
| 2008/0260514 A1 | 10/2008 | Nielsen et al. | |
| 2009/0091136 A1 | 4/2009 | Viterna | |

OTHER PUBLICATIONS

Siemens Research News, "New Project for Eco-Electricity Charging Stations", one page.
Sway Web Page, "Changing the Future of Wind Power", one page.

* cited by examiner

*Primary Examiner* — Nicholas Ponomarenko
(74) *Attorney, Agent, or Firm* — Armstrong Teasdale LLP

(57) ABSTRACT

A method for controlling operation of a floating wind turbine is described. The floating wind turbine includes a wind turbine generator coupled to a support tower. The method includes measuring a tower inclination, determining an operating parameter control value based on at least the measured tower inclination, and adjusting wind turbine operation based at least partially on the operating parameter control value.

20 Claims, 7 Drawing Sheets

METHODS AND SYSTEMS FOR OPERATING A WIND TURBINE

BACKGROUND OF THE INVENTION

The present disclosure relates generally to controlling operation of a wind turbine, and more specifically, to controlling operation of a floating wind turbine in response to changes in tower inclination.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine.

Typically, the wind turbine generator is positioned atop a vertical support tower, which is securely fixed to a surface, for example, land in a wind turbine field. Such an instillation maintains the rotor perpendicular to the ground. The wind turbine generator is rotatably mounted to the support tower such that the rotor may be rotated relative to the tower to maintain a perpendicular relationship between the rotor blades and the wind direction. Positioning wind turbine generators offshore enables the capture of wind energy from winds that are typically higher than winds over land. Offshore wind turbine generators typically include a tower securely fixed to a seabed in a similar manner to land-based wind turbine generators. For example, a portion of the tower may be buried within the seabed or coupled to a foundation buried within the seabed such that the tower is held in an upright position, perpendicular to a surface of the water. This type of instillation limits the use of offshore wind turbine generators due to a rapid increase in the depth of the oceans as a distance from land is increased. In other words, use of offshore wind turbine generators is typically limited to water depths of about twenty-five meters or less, which limits offshore wind turbine use to locations near the shore. Wind turbine generators that float in the water are known, however, stability issues may limit their use and/or the efficiency of such wind turbine generators.

BRIEF DESCRIPTION OF THE INVENTION

In one aspect, a method for controlling operation of a floating wind turbine is provided. The floating wind turbine includes a wind turbine generator coupled to a support tower. The method includes measuring a tower inclination, determining an operating parameter control value based on at least the measured tower inclination, and adjusting wind turbine operation based at least partially on the operating parameter control value.

In another aspect, a control system for controlling operation of a wind turbine is provided. The control system includes an inclination sensor configured to collect wind turbine tower inclination data and a processor communicatively coupled to the inclination sensor and configured to receive the wind turbine tower inclination data and to determine at least one operating parameter control value based at least partially on the wind turbine tower inclination data.

In yet another aspect, a floating wind turbine is provided. The floating wind turbine includes a tower configured to float in a body of water and a nacelle rotatably coupled to the tower. The floating wind turbine also includes a rotor that includes a plurality of rotor blades extending from a rotor hub. The rotor hub is coupled to an electric generator positioned at least partially in the nacelle. The wind turbine also includes an inclination sensor coupled to at least one of the nacelle and the tower. The inclination sensor is configured to determine an inclination of the tower. The wind turbine also includes a system controller configured to receive inclination data from the inclination sensor and to determine at least one operating parameter control value based at least partially on the inclination data.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Technical effects of the methods, systems, and computer-readable media described herein include at least one of: (a) measuring a tower inclination; (b) determining an operating parameter control value based on at least the measured tower inclination; and (c) adjusting at least one of a blade pitch, a generator torque, and a nacelle yaw based on at least the operating parameter control value.

The methods, systems, and computer readable media described herein facilitate determining wind turbine operating parameters based on a measured tower inclination. Including a tower inclination measurement in operating parameter determinations facilitates maintaining a maximum wind swept area of a rotor included in a floating wind turbine, therefore, increasing an efficiency of the floating wind turbine. Furthermore, including a tower inclination measurement in operating parameter determinations may facilitate reducing a tower inclination angle of the floating wind turbine.

Figure 1:
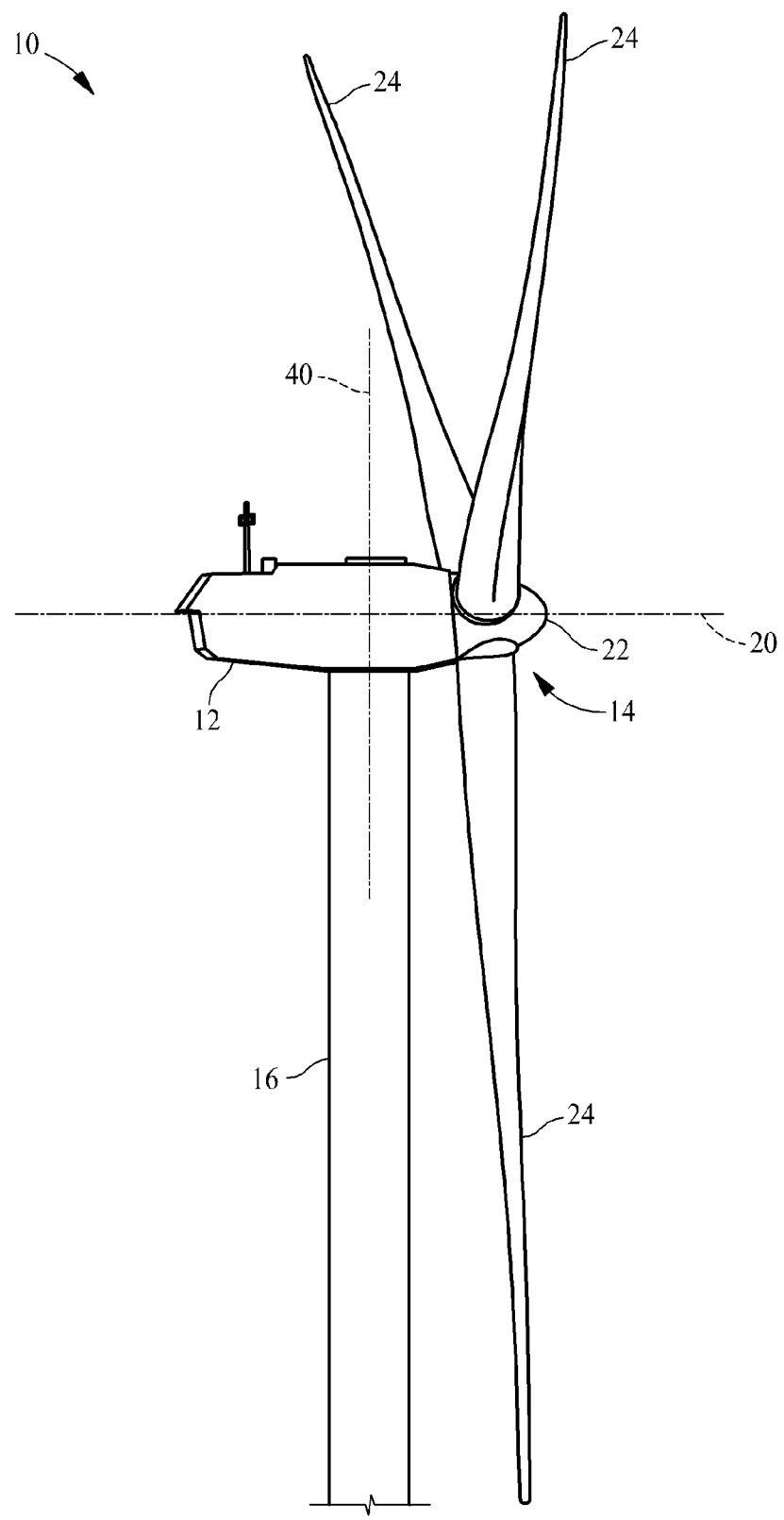
FIG. 1 is a perspective view of a portion of an exemplary wind turbine.
Figure 2:
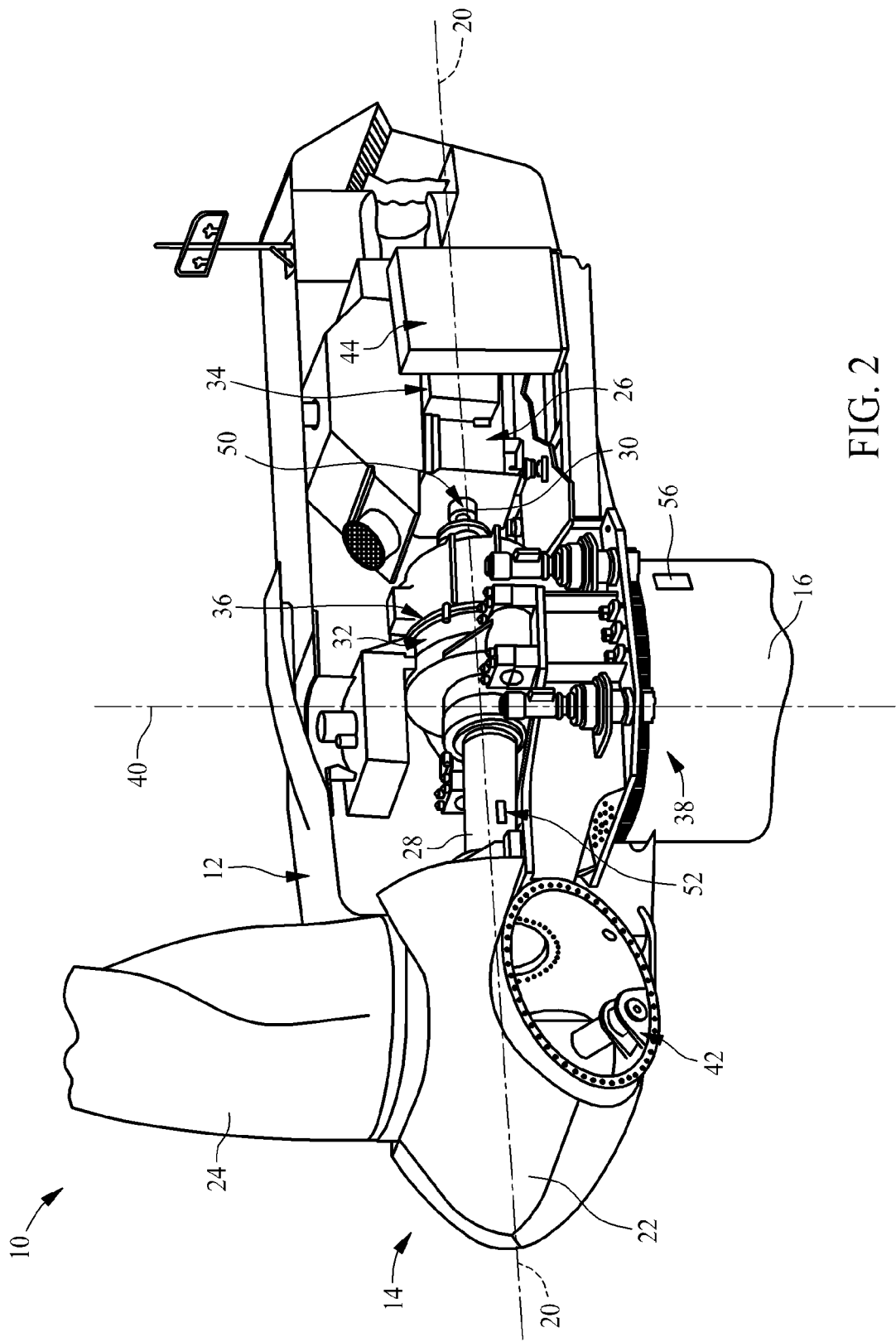
FIG. 2 is a partially cut-away view of a portion of the wind turbine shown in FIG. 1.

FIG. 1 is a perspective view of an exemplary wind turbine 10. FIG. 2 is a partially cut-away perspective view of a portion of wind turbine 10. Wind turbine 10 described and shown herein is a wind turbine generator for generating electrical power from wind energy. Moreover, wind turbine 10 described and illustrated herein includes a horizontal-axis configuration, however, in some embodiments, wind turbine 10 may include, in addition or alternative to the horizontal-axis configuration, a vertical-axis configuration (not shown). Wind turbine 10 may be coupled to an electrical load (not shown in FIG. 1), such as, but not limited to, a power grid, for receiving electrical power therefrom to drive operation of wind turbine 10 and/or its associated components and/or for supplying electrical power generated by wind turbine 10 thereto. Although only one wind turbine 10 is shown in FIGS. 1 and 2, in some embodiments, a plurality of wind turbines 10 may be grouped together, sometimes referred to as a "wind farm."

Wind turbine 10 includes a body or nacelle 12 and a rotor (generally designated by 14) coupled to nacelle 12 for rotation with respect to nacelle 12 about an axis of rotation 20. In the exemplary embodiment, nacelle 12 is mounted on a tower 16, however, in some embodiments, in addition or alternative to tower-mounted nacelle 12, nacelle 12 may be positioned adjacent the ground and/or a surface of water. The height of tower 16 may be any suitable height enabling wind turbine 10 to function as described herein. Furthermore, wind turbine 10 may be securely fixed to a surface (i.e., the ground) such that tower 16 extends from the surface substantially parallel to a gravity vector (e.g., substantially normal to a surface of the earth). Wind turbine 10 may also be configured to float in a body of water, for example, configured such that a portion of tower 16 floats in or on a surface of water with a portion of tower 16 and nacelle 12 extending from the water.

Rotor 14 includes a hub 22 and a plurality of blades 24 (sometimes referred to as "airfoils") extending radially outwardly from hub 22 for converting wind energy into rotational energy. Although rotor 14 is described and illustrated herein as having three blades 24, rotor 14 may have any number of blades 24. Blades 24 may each have any length that allows wind turbine 10 to function as described herein. For example, in some embodiments, one or more blades 24 are about one-half meter long, while in some embodiments one or more blades 24 are about fifty meters long. Other examples of blade 24 lengths include ten meters or less, about twenty meters, about thirty-seven meters, and about forty meters. Still other examples include blades between about fifty and about one-hundred meters long, and rotor blades greater than one-hundred meters long.

Despite how blades 24 are illustrated in FIG. 1, rotor 14 may have blades 24 of any shape, and may have blades 24 of any type and/or any configuration, whether such shape, type, and/or configuration is described and/or illustrated herein. One example of another type, shape, and/or configuration of blades 24 is a Darrieus wind turbine, sometimes referred to as an "eggbeater" turbine. Yet another example of another type, shape, and/or configuration of blades 24 is a Savonious wind turbine. Moreover, wind turbine 10 may, in some embodiments, be a wind turbine wherein rotor 14 generally faces upwind to harness wind energy, and/or may be a wind turbine wherein rotor 14 generally faces downwind to harness energy.

Referring now to FIG. 2, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. Generator 26 includes a stator (not shown) and a rotor (not shown) with an air gap included therebetween. Rotor 14 includes a rotor shaft 28 coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, the generator rotor has a generator shaft 30 coupled thereto and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28.

The torque of rotor 14 drives the generator rotor to thereby generate variable frequency AC electrical power from rotation of rotor 14. Generator 26 has an air gap torque between the generator rotor and stator that opposes the torque of rotor 14. A power conversion assembly 34 is coupled to generator 26 for converting the variable frequency AC to a fixed frequency AC for delivery to an electrical load (not shown in FIG. 2), such as, but not limited to, a power grid (not shown in FIG. 2) coupled to generator 26. Power conversion assembly 34 may include a single frequency converter or a plurality of frequency converters configured to convert electricity generated by generator 26 to electricity suitable for delivery over the power grid. Power conversion assembly 34 may also be referred to herein as a frequency converter. Power conversion assembly 34 may be located anywhere within or remote to wind turbine 10. For example, power conversion assembly 34 may be located within a base (not shown) of tower 16.

In some embodiments, wind turbine 10 may include a rotor speed limiter, for example, but not limited to a disk brake 36. Disk brake 36 brakes rotation of rotor 14 to, for example, slow rotation of rotor 14, brake rotor 14 against full wind torque, and/or reduce the generation of electrical power from electrical generator 26. Furthermore, in some embodiments, wind turbine 10 may include a yaw system 38 for rotating nacelle 12 about an axis of rotation 40 for changing a yaw of rotor 14, and more specifically, for changing a direction faced by rotor 14 to adjust an angle between the direction faced by rotor 14 and a direction of wind 122 (shown in FIG. 4).

In the exemplary embodiment, wind turbine 10 includes a variable blade pitch system 42 for controlling (e.g., changing) the pitch angle of blades 24 (shown in FIGS. 1 and 2) with respect to a wind direction. A system controller 44 may be coupled to pitch system 42 to control operation of pitch system 42. Pitch system 42 is coupled to hub 22 and blades 24 for changing the pitch angle of blades 24 by rotating blades 24 with respect to hub 22. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

Figure 3:
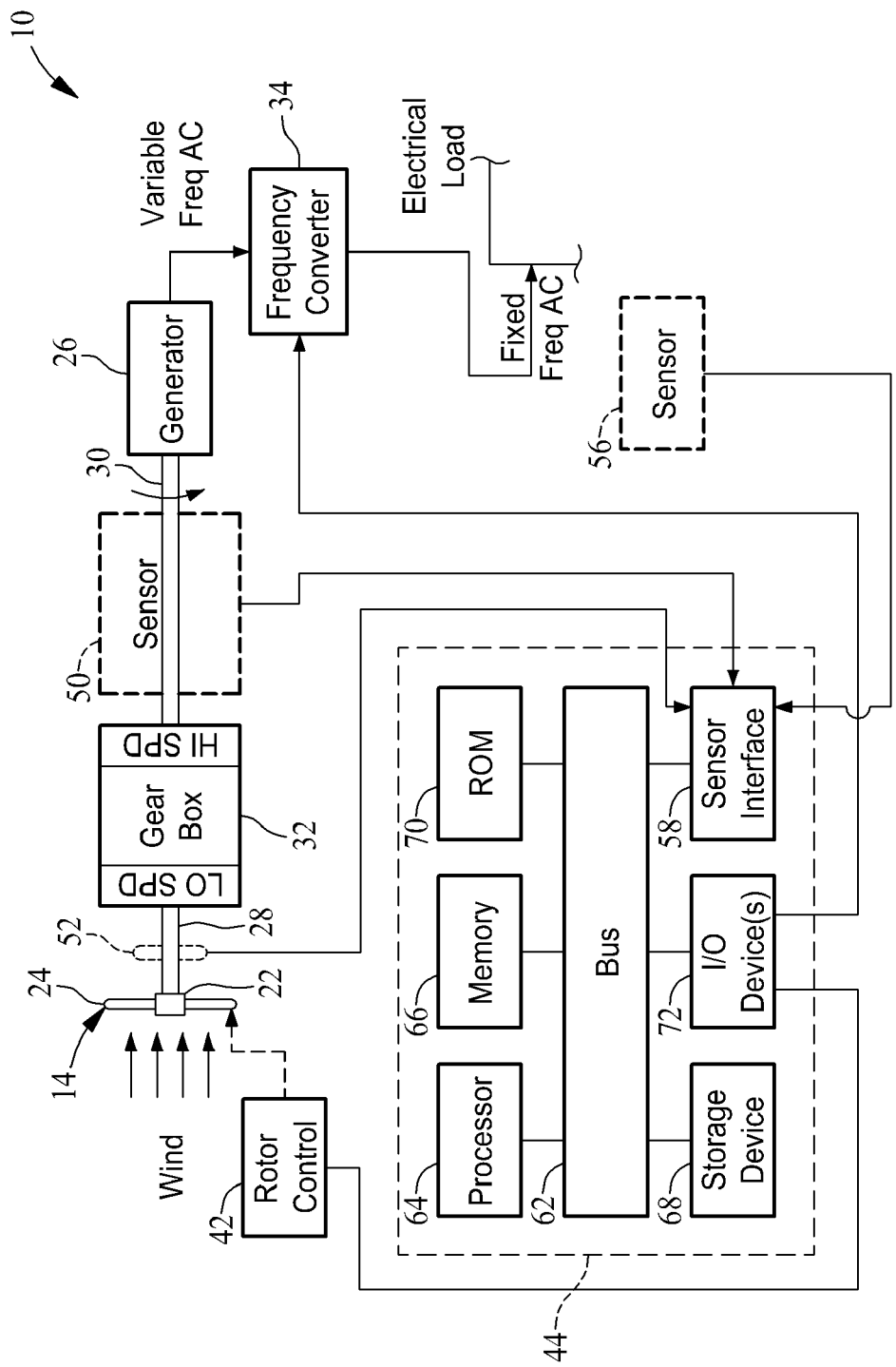
FIG. 3 is a block diagram of the wind turbine shown in FIG. 1.

FIG. 3 is a block diagram of an exemplary wind turbine 10. In the exemplary embodiment, wind turbine 10 includes one or more system controllers 44 coupled to at least one component of wind turbine 10 for generally controlling operation of wind turbine 10 and/or controlling operation of the components thereof, regardless of whether such components are described and/or shown herein. For example, in the exemplary embodiment system controller 44 is coupled to pitch system 42 for generally controlling rotor 14. In the exemplary embodiment, system controller 44 is mounted within nacelle 12 (shown in FIG. 2), however, additionally or alternatively, one or more system controllers 44 may be remote from nacelle 12 and/or other components of wind turbine 10. System controllers 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

In an exemplary embodiment, wind turbine 10 includes a plurality of sensors, for example, sensors 50 and/or 52. Sensors 50 and/or 52 measure a variety of parameters including, without limitation, operating conditions and atmospheric conditions. For example, sensors 50 and/or 52 may measure, but are not limited to measuring, a wind speed, a wind direction, a rotational speed of rotor shaft 28, and/or an electrical output of generator 26. Each sensor 50 and 52 may be an individual sensor or may include a plurality of sensors. Sensors 50 and 52 may be any suitable sensor having any suitable location within or remote to wind turbine 10 that allows wind turbine 10 to function as described herein. In some embodiments, sensors 50 and/or 52 are coupled to system controller 44 for transmitting one or more measurement signals to system controller 44 for processing of the signals.

In the exemplary embodiment, wind turbine 10 also includes a tower inclination sensor 56. For example, tower inclination sensor 56 may include, but is not limited to, an inclinometer and/or an acceleration sensor. Tower inclination sensor 56 measures an inclination angle 140 (shown in FIG. 4) and an inclination direction 138 (shown in FIG. 5). An output of tower inclination sensor 56 is provided to system controller 44 through a sensor interface 58. In the exemplary embodiment, tower inclination sensor 56 is positioned on or within nacelle 12, on or within tower 16, and/or in any position on or within wind turbine 10 that allows tower inclination sensor 56 to function as described herein.

In some embodiments, system controller 44 includes a bus 62 or other communications device to communicate information. One or more processor(s) 64 are coupled to bus 62 to process information, including information from sensors 50, 52, and 56 and/or other sensor(s). Processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 44 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control outputs, blade pitch control outputs, and/or frequency converter control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface such as a mouse and a keyboard (neither shown in FIG. 3). Alternatively, other computer peripherals may also be used that may include, for example, a scanner (not shown in FIG. 3). Furthermore, in the exemplary embodiment, additional output channels may include, for example, an operator interface monitor (not shown in FIG. 3). System controller 44 may also include sensor interface 58 that allows system controller 44 to communicate with sensors 50, 52, and 56 and/or other sensor(s). Sensor interface 58 may include one or more analog-to-digital converters that convert analog signals into digital signals that can be used by processor(s) 64.

Figure 4:
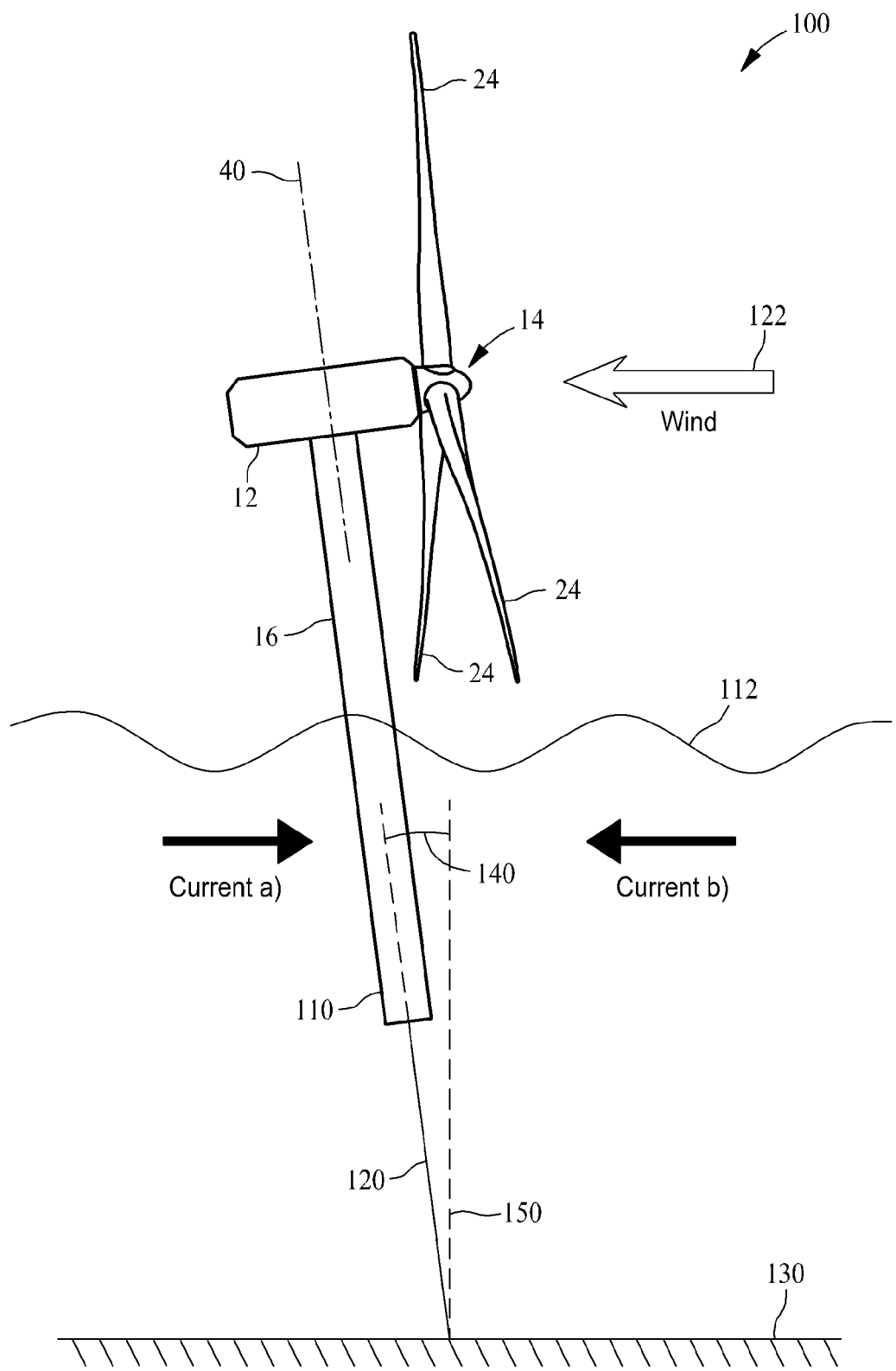
FIG. 4 is a perspective view of an exemplary embodiment of a floating wind turbine.

FIG. 4 is a perspective view of wind turbine 10, wherein wind turbine 10 is a floating wind turbine. In the exemplary embodiment, tower 16 of floating wind turbine 10 is buoyant, and includes a weight at a bottom 110 of tower 16 that facilitates maintaining floating wind turbine 10 in an upright orientation (i.e., a portion of tower 16 and nacelle 12 extending upright from a surface 112 of the water). Floating wind turbine 10 may be anchored using an anchoring device 120, for example, but not limited to a cable or a pole, to an underwater surface such as a seabed 130 to maintain a location and/or orientation of floating wind turbine 10. Furthermore, in the exemplary embodiment, anchoring device 120 also facilitates electrically coupling wind turbine 10 to, for example, an electric grid (not shown in FIG. 4). An inclination of floating wind turbine 10 is effected by both wind and water current. The inclination is a vector that includes an inclination direction 138 (shown in FIG. 5) and an inclination angle 140. In the exemplary embodiment, inclination direction 138 is measured relative to a reference direction 146 (shown in FIG. 5) and is described as an angle from reference direction 146 to a point on a circle 148 projected on a reference plane (e.g., surface 112 of water) that corresponds to the direction of tower inclination. For example, if tower 16 is inclined toward reference direction 146, inclination direction 138 is zero degrees. Moreover, if tower 16 is inclined away from reference direction 146, inclination direction 138 is one-hundred and eighty degrees. Reference direction 146 may be a predefined, fixed reference direction, or may correspond to a measured parameter, for example, wind direction 122.

In the exemplary embodiment, inclination angle 140 is measured relative to a normal 150 to surface 112. Inclination angle 140 describes the severity of the inclination compared to an ideal inclination (e.g., zero degrees). Furthermore, to describe the effect wind tower inclination may have on wind turbine 10, an azimuth angle 152 (shown in FIG. 5) is defined as an angle from reference direction 146 to a point on circle 148 that corresponds to a direction that rotor 14 faces (e.g., axis of rotation 20 of rotor 14). As described above, yaw system 38 rotates nacelle 12 about axis of rotation 40. For example, yaw system 38 may rotate nacelle 12 to change azimuth angle 152 from zero degrees to fifteen degrees as a reaction to a change in wind direction 122. Typically, yaw system 38 maintains rotor 14 perpendicular to wind direction 122 by monitoring wind direction 122. Wind direction 122 is typically estimated by average wind direction due to wind turbulence that may cause inaccurate instantaneous wind measurements. Relying on estimated averages causes a delay in reacting to a change in wind direction. The methods and systems described herein change a yaw of nacelle 12 in response to wind direction, and additionally, in response to a change in wind tower inclination.

Figure 5:
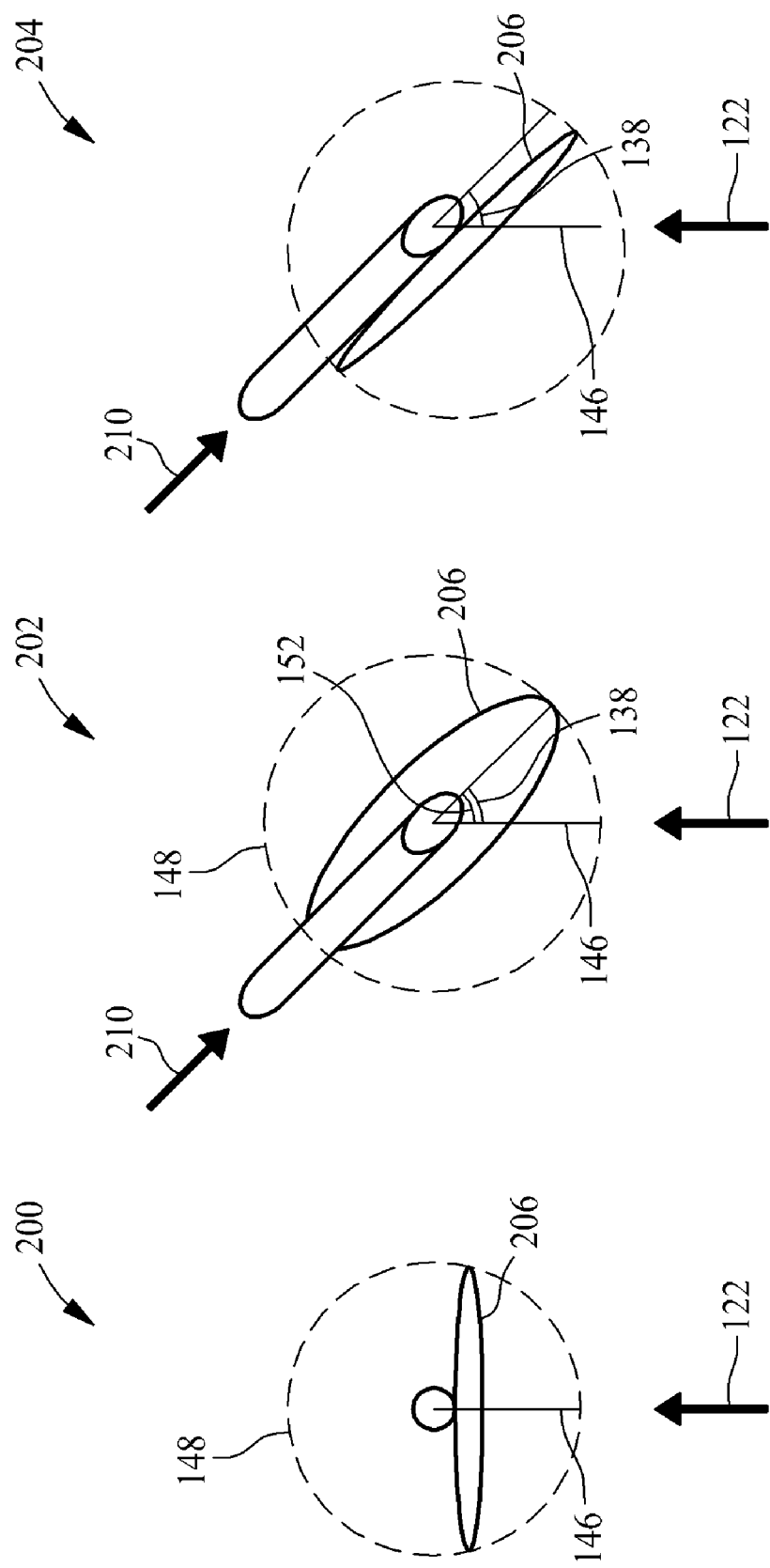
FIG. 5 is a schematic diagram of a top view of the floating wind turbine shown in FIG. 4.

FIG. 5 is a first top view 200, a second top view 202, and a third top view 204 of floating wind turbine 10 (shown in FIG. 4). A wind swept area 206 is shown as tower inclination angle 140 and azimuth angle 152 are effected by wind and/or water current. Wind swept area 206 is defined herein as an area, that is perpendicular to wind direction 122, through which rotor blades 24 rotate. When rotor 14 is perpendicular to wind direction 122, wind swept area 206 is a circle having a radius equal to a length of rotor blades 24. When rotor 14 is perpendicular to the wind direction, wind swept area 206 is a maximum for wind turbine 10, and energy production potential from wind turbine 10 is also a maximum. In other words, a power output of wind turbine 10 is directly related to wind swept area 206. In first top view 200, tower inclination direction 138, tower inclination angle 140, and azimuth angle 152 are all zero degrees. In other words, tower 16 is substantially perpendicular to surface 130 and rotor 14 is substantially perpendicular to reference direction 146. In second top view 202, a water current 210 has changed tower inclination direction 138 and tower inclination angle 140. Since nacelle 12 has not moved relative to tower 16, as tower inclination direction 138 and tower inclination angle 140 change, azimuth angle 152 also changes, and wind swept area 206 is reduced. For example, in second top view 202, tower inclination direction 138 and azimuth angle 152 are equal and are not zero degrees. In third top view 204, a yaw of nacelle 12 is changed, therefore changing azimuth angle 152 of nacelle 12, in response to the change in tower inclination direction 138 and tower inclination angle 140. In third top view 204, azimuth angle 152 is zero degrees even though inclination direction 138 remains at a non-zero value. In the exemplary embodiment, tower inclination sensor 56 (shown in FIG. 3) measures tower inclination direction 138 and tower inclination angle 140, provides inclination data to control system 44, where a yaw adjustment signal is generated and sent to yaw system 38.

Figure 6:
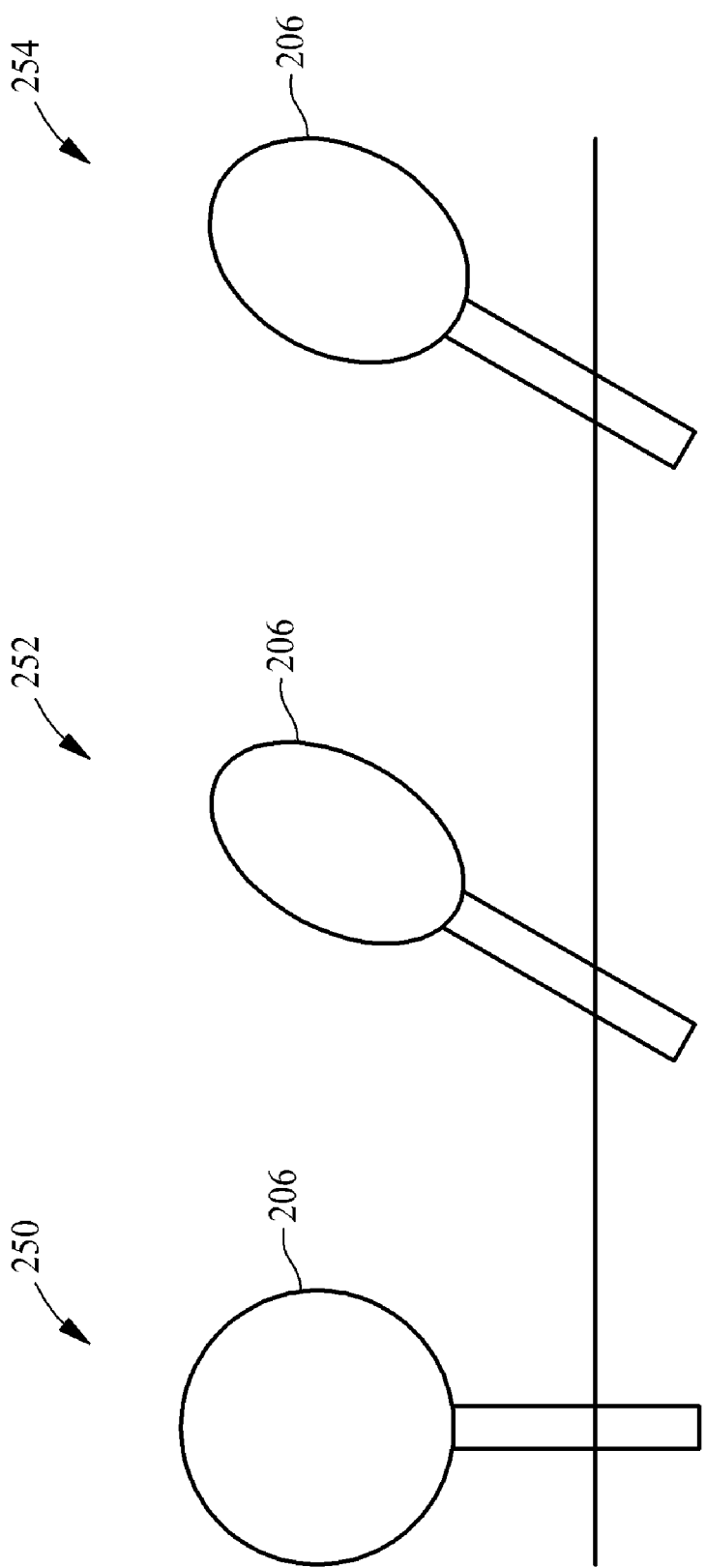
FIG. 6 is a schematic diagram of a front view of the floating wind turbine shown in FIG. 4.

FIG. 6 is a first front view 250, a second front view 252, and a third front view 254 of floating wind turbine 10 (shown in FIG. 4). First front view 250 corresponds to first top view 200 (shown in FIG. 5) where tower inclination direction 138, tower inclination angle 140, and azimuth angle 152 are zero degrees. Second front view 252 corresponds to second top view 202 (shown in FIG. 5) where tower inclination direction 138 and tower inclination angle 140 have been effected by water current 210, which changes azimuth angle 152, causing a reduction in wind swept area 206. Third front view 254 corresponds to third top view 204. The yaw adjustment performed in response to the change in tower inclination direction 138 and tower inclination angle 140 increases wind swept area 206. As described above, increasing wind swept area 206 increases the energy production potential of wind turbine 10.

Figure 7:
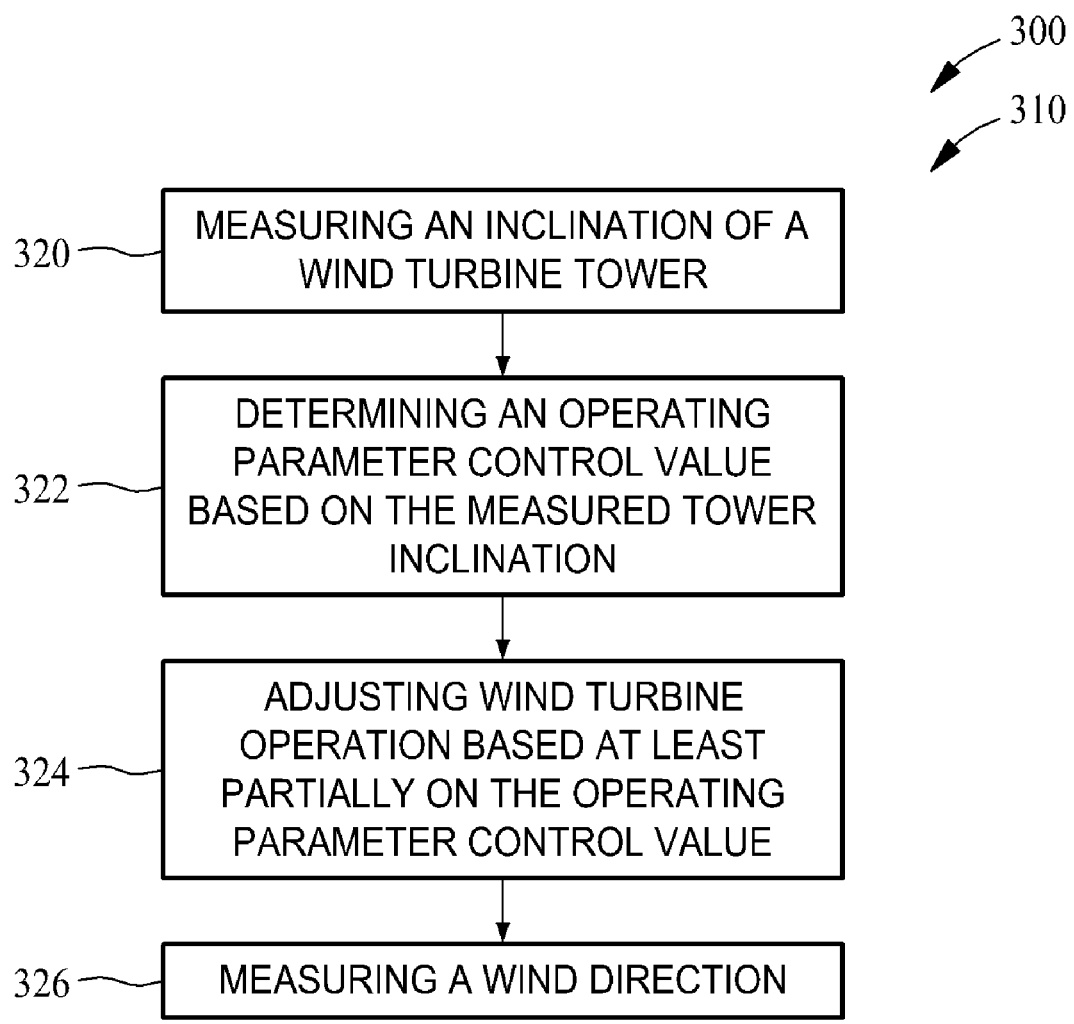
FIG. 7 is a flow chart showing an exemplary method of controlling operation of the wind turbine shown in FIG. 4.

FIG. 7 is a flow chart 300 showing an exemplary method 310 of controlling operation of floating wind turbine 10 (shown in FIG. 4). In an exemplary embodiment, method 310 is a computer-implemented method, for example, a computer-implemented method executed by a workstation and/or personal computer, for example, system controller 44 (shown in FIG. 2). In another exemplary embodiment, a computer program embodied on a computer readable medium includes at least one code segment, that when executed by a computer, performs method 310. In the exemplary embodiment, method 310 includes measuring 320 an inclination of a wind turbine tower, for example tower 16 (shown in FIG. 4). Measuring 320 includes measuring an inclination direction, for example, inclination direction 138 (shown in FIG. 5) and an inclination angle, for example, inclination angle 140 (shown in FIG. 4). In the exemplary embodiment, method 310 also includes determining 322 an operating parameter control value based on the measured tower inclination. The operating parameter control value may include a set-point corresponding to a final position or setting of a component or system within wind turbine 10. Alternatively, the operating parameter control value may include an adjustment value configured to change a position or a setting of a component or system within wind turbine 10. In the exemplary embodiment, determining 322 an operating parameter control value may include determining a yaw control value, a blade pitch control value, and/or a frequency converter control value based at least partially on the measured tower inclination. The tower inclination is measured by tower inclination sensor 56 (shown in FIG. 3), for example, and a system controller, for example, system controller 44 (shown in FIG. 3) determines the operating parameter control value based at least partially on the tower inclination.

In the exemplary embodiment, method 310 further includes adjusting 324 operation of wind turbine 10 based at least partially on the operating parameter control value. More specifically, adjusting 324 includes adjusting at least one of a nacelle yaw, a blade pitch, and a generator torque based on the operating parameter control value. The operating parameter control value may facilitate changing a previous blade pitch setting, nacelle yaw setting, and/or frequency converter setting (i.e., generator torque setting). The operating parameter control value may also direct motion of blade pitch system 42, yaw system 38, and/or a set point of frequency converter 34 to a final position/set point. In the exemplary embodiment, system controller 44 determines the at least one operating parameter control value by accessing a look-up table stored in a memory, for example, memory 66 (shown in FIG. 3).

In the exemplary embodiment, the operating parameter control value may include, but is not limited to, a nacelle yaw control value. As described above, an azimuth angle of nacelle 12, for example, azimuth angle 152 (shown in FIG. 5) is adjusted in response to a change in tower inclination. The operating parameter control value may also include a generator torque control value, a blade pitch control value, and/or any other operating parameter control value that allows floating wind turbine 10 to function as described herein.

Method 310 may further include measuring 326 a wind direction. Determining 322 an operating parameter control value may include calculating an operating parameter control value based at least partially on the measured wind direction and the measured tower inclination. For example, nacelle yaw is not changed when a tower inclination direction is substantially parallel to the wind direction. Furthermore, nacelle yaw is also not changed when a tower inclination direction is substantially perpendicular to the wind direction. Any other inclination direction relative to wind direction would benefit from a yaw adjustment based on the measured wind direction and the measured tower inclination. As described above, adjusting the nacelle yaw facilitates maintaining a maximum wind swept rotor area.

In the exemplary embodiment, adjusting 324 at least one of the blade pitch and the generator torque includes adjusting blade pitch and/or generator torque when the inclination direction is substantially perpendicular to the wind direction. More specifically, the pitch of blades 24 may be changed when a tower inclination is sensed in the same direction, or the opposite direction, as the measured wind direction. For example, to reduce an inclination angle in the same direction as the wind direction, the pitch of blades 24 may be adjusted toward feathering of the blades, which reduces a force of the wind imparted on the blades 24, therefore reducing the inclination angle of wind turbine 10. Furthermore, to reduce an inclination angle in the opposite direction as the wind, the pitch of blades 24 may be adjusted away from feathering, such that the wind imparts increased force on blades 24, and the inclination angle of wind turbine 10 is reduced. More specifically, if water current is causing wind turbine 10 to lean toward the wind, pitch of blades 24 is adjusted such that the wind imparts greater force on wind turbine 10, which counteracts the water current pushing tower 16 in the opposite direction. Monitoring wind turbine inclination, and adjusting wind turbine operation based on wind turbine inclination, facilitates maximizing an output power of wind turbine 10 through a compromise between optimum blade angle and optimum tower inclination.

In an alternative embodiment, either separate from adjusting a pitch of blades 24, or in combination with adjusting the pitch of blades 24, a generator torque may be adjusted in response to a measured tower inclination in the same direction, or the opposite direction, of the measured wind direction. For example, to reduce an inclination angle in the same direction as the wind, a generator torque is reduced. Reducing the generator torque facilitates easier rotation of rotor 14, and therefore, the inclination angle is reduced. Furthermore, to reduce an inclination angle in the opposite direction as the wind, the generator torque is increased. Increasing the generator torque increases the wind energy needed to rotate rotor 14, which reduces the inclination angle.

In the exemplary embodiment, adjusting 324 the blade pitch, the generator torque, and the nacelle yaw is performed in substantially real-time. In an alternative embodiment, adjusting 324 the blade pitch, the generator torque, and the nacelle yaw is performed after a predefined delay from a measured change in tower inclination. Real-time adjustment facilitates rapid response to measured changes in tower inclination and therefore, rapid optimization of wind turbine performance. Adjustment of wind turbine operating conditions after a predefined delay prevents turbulent water currents or waves from unnecessarily affecting wind turbine operation. Using a delay facilitates adjusting wind turbine operation upon a tower inclination that is sustained longer than a predefined length of time. For example, wind turbine operation may be adjusted when a tower inclination lasting more than two seconds is measured.

The above-described embodiments facilitate efficient and cost-effective operation of a floating wind turbine. The wind turbine includes a tower inclination sensor that measures an inclination of the tower and provides inclination data to the system controller. Measuring the tower inclination either alone, or in combination with a wind direction, facilitates rapid response to a change in tower inclination. Adjustment of a nacelle yaw, a blade pitch, and/or a generator torque in response to the measured tower inclination facilitates efficient operation of the wind turbine.

Exemplary embodiments of a floating wind turbine are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling operation of a floating wind turbine, the floating wind turbine including a wind turbine generator coupled to a support tower, said method comprising:
    measuring a tower inclination;
    determining an operating parameter control value based on at least the measured tower inclination; and,
    adjusting wind turbine operation based at least partially on the operating parameter control value.

2. A method in accordance with claim 1, said method further comprising measuring a wind direction.

3. A method in accordance with claim 2, the tower inclination including an inclination angle and an inclination direction, wherein adjusting wind turbine operation comprises adjusting at least one of a blade pitch, a generator torque, and a nacelle yaw based at least partially on the operating parameter control value and the wind direction.

4. A method in accordance with claim 3, wherein adjusting at least one of the blade pitch and the generator torque comprises adjusting the blade pitch and the generator torque when the inclination direction is not perpendicular to the measured wind direction.

5. A method in accordance with claim 3, wherein adjusting the blade pitch comprises increasing a blade angle if the inclination direction is toward the wind direction.

6. A method in accordance with claim 3, wherein adjusting the blade pitch comprises decreasing a blade angle if the inclination direction is away from the wind direction.

7. A method in accordance with claim 3, wherein adjusting the generator torque comprises increasing the generator torque if the inclination direction is toward the wind direction.

8. A method in accordance with claim 3, wherein adjusting the generator torque comprises decreasing the generator torque if the inclination direction is away from the wind direction.

9. A method in accordance with claim 3, wherein adjusting the nacelle yaw comprises adjusting the nacelle yaw when the tower inclination direction is neither perpendicular to the measured wind direction nor parallel to the measured wind direction.

10. A method in accordance with claim 9, wherein adjusting the nacelle yaw comprises adjusting the nacelle yaw to maintain a maximum swept rotor area.

11. A method in accordance with claim 1, wherein adjusting wind turbine operation comprises at least one of adjusting wind turbine operation in substantially real-time and adjusting wind turbine operation after a predefined delay from a measured change in tower inclination.

12. A control system for controlling operation of a wind turbine, said control system comprising:
   an inclination sensor configured to collect wind turbine tower inclination data; and,
   a processor communicatively coupled to said inclination sensor and configured to receive the wind turbine tower inclination data and to determine at least one operating parameter control value based at least partially on the wind turbine tower inclination data.

13. A control system in accordance with claim 12, wherein said processor is further configured to control at least one of a blade pitch, a generator torque, and a nacelle yaw based on the operating parameter control value.

14. A control system in accordance with claim 12, further comprising a wind direction sensor configured to provide wind direction data to said processor.

15. A control system in accordance with claim 14, wherein said processor is further configured to control operation of at least one of a blade pitch control system, a frequency converter, and a yaw adjustment system based at least partially on the wind turbine tower inclination data and the wind direction data.

16. A floating wind turbine, comprising:
   a tower configured to float in a body of water;
   a nacelle rotatably coupled to said tower;
   a rotor comprising a plurality of rotor blades extending from a rotor hub, said rotor hub coupled to an electric generator positioned at least partially in said nacelle;
   an inclination sensor coupled to at least one of said nacelle and said tower, said inclination sensor configured to determine an inclination of said tower; and,
   a system controller configured to receive inclination data from said inclination sensor and to determine at least one operating parameter control value based at least partially on the inclination data.

17. A floating wind turbine in accordance with claim 16, wherein said system controller is further configured to control at least one of a blade pitch, a generator torque, and a nacelle yaw based on the operating parameter control value.

18. A floating wind turbine in accordance with claim 16, further comprising a wind direction sensor configured to provide wind direction data to said system controller.

19. A floating wind turbine in accordance with claim 18, wherein said system controller is configured to control operation of at least one of a blade pitch control system, a frequency converter, and a yaw adjustment system based at least partially on the inclination data and the wind direction data.

20. A floating wind turbine in accordance with claim 16, wherein said system controller is configured to determine the operating parameter control value in at least one of substantially real-time and after a predefined delay from receipt of the tower inclination data.

* * * * *